United States Patent [19]
Cottell

[11] 3,715,104
[45] Feb. 6, 1973

[54] APPARATUS FOR CARRYING OUT ULTRASONIC AGITATION OF LIQUID DISPERSIONS

[76] Inventor: Eric Charles Cottell, Windermere, Bayville, N.Y. 11709

[22] Filed: Nov. 5, 1970

[21] Appl. No.: 87,263

[52] U.S. Cl. ............................. 259/1 R, 259/DIG. 44
[51] Int. Cl. ............................................. B01f 11/02
[58] Field of Search ...B01f/11/02; 259/DIG. 44, 1 R, 259/4; 310/26

[56] References Cited

UNITED STATES PATENTS

| | | | |
|---|---|---|---|
| 3,410,532 | 11/1968 | Bodine | 259/4 |
| 2,851,889 | 9/1958 | Damond | 259/1 R X |
| 3,176,964 | 4/1965 | Cottell et al. | 259/DIG. 44 |
| 3,229,961 | 1/1966 | Bodine | 259/1 R |
| 3,591,862 | 7/1971 | Winston | 259/1 R X |

Primary Examiner—Robert W. Jenkins
Assistant Examiner—Phillip R. Coe
Attorney—Robert Ames Norton and Saul Leitner

[57] ABSTRACT

Liquid systems, such as aqueous dispersions of cells, are passed across the space between plates, one of which is attached to the end of an ultrasonic probe. The other plate is stationary and mounted in a container which permits carrying out the operation under any desired pressure. The plates are spaced the desired distance for maximum efficiency and there are two liquid conduits into the container, one at the side and directed across the space, and the other axial. One or both plates may be provided with baffles, such as spiral baffles or labyrinths to keep the liquid flowing thereover in the ultrasonic zone for a sufficient time. The direction of flow of the liquid is important, and the best results are obtained if the liquid flows in the inlet conduit across the plates and out the axial conduit instead of the reverse. Efficiency is greatly increased, and certain very tough cells, such as yeast cells, can be ruptured with relatively small outputs of energy.

5 Claims, 4 Drawing Figures

INVENTORS
ERIC C. COTTELL

BY Robert Ames North

ATTORNEY

APPARATUS FOR CARRYING OUT ULTRASONIC AGITATION OF LIQUID DISPERSIONS

BACKGROUND OF THE INVENTION

Ultrasonic agitation of liquids has been used for many years and for many purposes, such as cleaning of articles. Another very important use which is involved in the present invention is treatment of liquid dispersions or liquid reaction media by passing them through a zone of intense ultrasonic agitation. One of the important uses of ultrasonic agitation is to rupture the walls of celled organisms to set free the contents of the cells. For example, yeast cells, if ruptured, set free their contents, which can then be concentrated and used for fortifying foods such as bread as the yeast protein is very high in lysine, an amino acid which is sometimes deficient in certain foodstuffs.

The federal government has some rather stringent requirements when ruptured cells are to be used in making additives for foodstuffs. The requirement is that a very high percentage of the cells, and particularly their membranes, must be ruptured so that cell contents, such as high lysine protein in the case of yeast cells, can be recovered relatively free from contaminating material which can be toxic or introduce undesired genetic compounds, such as DNA. In the past mechanical rupturing, which is, of course, preferred over chemical methods because it does not introduce additional contaminants, has often been economically unsatisfactory for various reasons, such as excessive cost. When ultrasonic vibrations are used, it is very difficult, if not impossible, to rupture yeast cells to the desired extent with economically satisfactory power inputs. Even if ultrasonic means are used for a very long period of time, which sometimes will rupture yeast cells with very high energy input, the output per unit time is so small that such a process is ordinarily not economically feasible.

When ultrasonic agitation is to be effected in a confined zone, it is common to use what is ordinarily referred to as an ultrasonic probe. This is a metal rod having a large end which is vibrated by the ultrasonic transducer and tapers to a much smaller end at a point where the vibration is to be applied to liquids. This results in an intensification of the ultrasonic energy and might be considered as an acoustic velocity transformer. Sometimes plates are screwed into the end of an ultrasonic probe, and many of such probes, such as, for example some of those sold by Branson Instruments under their trademark "Sonifier," are provided with a tapped hole in their end to receive stems of plates.

Because of the fact that the intensity of sonic and particularly ultrasonic vibration can be rapidly attenuated in passing through long paths in liquid, a considerable problem is presented because piezoelectric and magnetostrictive elements are limited in the amount of power which can be generated in the form of ultrasonic vibrations. The intensity of the ultrasonic vibrations in the liquid zone where they are to be effected and where violent cavitation is needed is a very serious factor in the cost of ultrasonic treatment. The operation of ultrasonic agitation in liquids is very well known and depends on the temporary formation of small bubbles which then collapse, producing cavitation and intense mechanical forces.

The use of ultrasonic probes and other mechanical methods for liquid reactions, and particularly for the rupture of cells or other small particles in liquid suspensions, presents a serious economical and technical problem as some cells, such as yeast cells, have very tough membranes. Reasonable outputs with reasonable power costs are difficult to obtain with conventional and other ultrasonic methods. It has been proposed to flow liquid dispersions through channels in special ultrasonic probes. This has proved not to be very efficient because it is, in general, applicable to batch processes which introduce random effects. Even if a continuous flow is attempted, the efficiency is usually quite low, and such procedures have had serious practical limitations. Even with liquid media which present a less serious problem, the efficiency of ultrasonic agitation is still an important economic factor.

SUMMARY OF THE INVENTION

The present invention utilizes a sonic, or preferably ultrasonic, probe in a confined space, such as a container, preferably with a plate screwed into the end of the probe and another plate closely adjacent thereto. It is important that the space between the plates be micrometrically adjustable and that the channel between the plates be of uniform and small dimension so that liquid dispersions flowing between the plates are maintained in a thin or short path exposed to violent ultrasonic vibrations.

The container is provided with two liquid conduits, one coming in from the side and directed substantially across the plates and the other axial. The flow of liquid across the plates makes it possible to have a somewhat extended zone of ultrasonic vibration as the plates can be brought close together so that there are not such long paths through liquid as to attenuate seriously the force of the ultrasonic vibrations and in some cases that the amplitude of vibration approximates the spacing between the plates.

As the effect of the ultrasonic agitation is often not instantaneous, it is sometimes desirable to increase the length of time during which the liquid flows through the zone of violent agitation, and for this purpose baffles may be provided on one or both of the plates, which cause the flow to be distributed over a larger portion of the plate and to maintain the liquid in the zone of intense agitation for sufficient time. The present invention in a broader aspect is not limited to baffles, such as spiral baffles or labyrinth type baffles, preferably matched on each plate, although for many operations the presence of baffles is of considerable practical importance.

The flow of liquid between plates is something which is not normally considered desirable. For example, the Plesset et al. U.S. Pat. No. 3,072,808, Jan. 8, 1963, which has a plate screwed on the end of an ultrasonic probe, deliberately reduces or prevents sideways flow by providing a lip or shoulder on the edges of the plate. The Plesset et al. patent teaches the desirability of preventing sideways flow because otherwise they had found that there was more wear on the vibrating plate when the bubbles flowed out in a finger pattern. In the present invention, where there is a definite, carefully directed flow between plates, the operation is proceeding on quite a different principle and, of course, goes contrary to the teachings of the prior art as represented by the Plesset et al. patent.

The flow of liquid system across the plates may either be under pressure, that is to say, where the liquid dispersion is pumped in, or it may flow by having the outlet under suction. It is, of course, possible to combine both methods. When pressure flow is used, it is sometimes desirable to increase the pressure downstream from the outlet conduit, which can be done by throttling or other means, and such operations are included in the present invention.

While in its broadest aspects the present invention is not limited to which of the conduits is inlet and which is outlet or, in process terminology, whether the flow is from the periphery of the plates in or from the center out, a preferred modification introduces the liquid medium to be treated at the periphery of the plates and removes it axially. This is directly contrary to the normal design of ultrasonic equipment, where it is customary for liquids to be treated to be introduced more or less centrally. One would expect that it would make no difference in which direction the liquid flows, and in fact the common direction used in ultrasonic equipment would indicate that central introduction is preferable. It has been found, however, in the present invention that there is a difference, and when the liquid is introduced at the periphery of the plates and removed centrally, an increase in efficiency and effectiveness results. An example of the above effect can be given by considering the rupturing of suspensions of yeast cells in a liquid medium. If the introduction is axial, and using practically feasible ultrasonic power, the tough membranes of the yeast cells are not reliably and completely ruptured. With comparable ultrasonic power, however, but with a flow across the plates and out axially, yeast cells can be readily and completely ruptured. This increase in efficiency and improved result is surprising, and it is not known why it occurs. Therefore, this preferred modification of the invention is not limited to any theoretical reason of why the large increase in efficiency takes place.

It is of considerable importance to maintain the spacing of the plates to a definite value, which, however, is not the same for all operations as the optimum spacing will vary with the frequency of ultrasonic vibration and the nature and physical characteristics of the liquid media to be treated. In every case the spacing is fairly close so that the path of ultrasonic vibrations in the liquid medium between plates is kept well below the point at which loss in efficiency takes place. It is not practical or even possible to calculate the exact preferred thickness for each operation, and ordinarily at the start, with any particular new medium and any particular ultrasonic frequency, small adjustments of the plate spacing should be made until optimum results are achieved, but once determined, the same spacing will continue to hold.

The pressure on the liquid medium in the zone of agitation, or in apparatus terms in the container, can vary, and in many places a positive pressure is desirable. Just as in the spacing of the plates, which has been described above, the particular pressure which is optimum for one operation is not necessarily optimum for another, but once an optimum or approximate optimum has been determined, this does not change unless the nature of the liquid to be treated, the ultrasonic frequency, and other factors are changed.

In general the pressure requires adjustment which is much less precise than the spacing of the plates, and this of course is a practical operating advantage. This is not to say that the spacing is so critical that it presents operating problems. A precise setting is not so critical as to render operation unreliable. However, it is quite precise for any particular ultrasonic frequency and liquid medium and other operating conditions and so should initially be adjusted with care. This need for care leads to a consideration which is of primary importance in the apparatus aspect of the present invention. Preferably, the container into which the ultrasonic probe or generator projects is mounted for micrometric axial movement. A very simple and practical form is the micrometric adjustment used for moving tools on laths.

The movement of the container, and hence of the plate or surface which is not associated with the end of the ultrasonic probe, requires that the probe enter the container through a liquid tight seal. This seal is normally in the form of an elastic O-ring or similar elastic ring. The ultrasonic probe should enter the container at a point at or close to an odd number of quarter wavelengths, i.e., a node. This avoids undesired vibration of the container and heating up of the seal. The broad concept of introducing ultrasonic probes into a container at a nodal point is not new per se. It is a more or less necessary requirement in the present invention but is not the primary feature which distinguishes it from the prior art. There is, however, a factor which is of practical importance. Since preferably, from the apparatus standpoint, plate spacing is effected by moving the container, it might be thought that such movement would destroy the advantages of the probe entering the container at approximately a nodal point. It has been found, however, that there is a distance about the exact nodal point over which the motion of the probe does not increase rapidly, and so the small movement of the container to set plate spacing can be accommodated by the elasticity of the sealing ring and does not cause significant heating of the seal, nor is movement transmitted to the container. In other words, it has been found in the present invention that it is not essential that the probe be sealed into a container wall at exactly the quarter wavelength nodal point as was considered important in the past. This is an added advantage of the present invention.

Preferably the plates, or at least the plate on the end of the ultrasonic probe, are detachable, so that different plates may be used for special purposes; and of course after long operation a worn plate can be replaced. The invention is not limited to detachable plates, and of course a plate can be formed of or machined into an ultrasonic probe end. However, it is an advantage of the invention that the tapped hole, which is so common in the ends of ultrasonic probes, can be used to permit changing of plates where desired. Similarly, the matching of baffles on the plates may be changed as required. It should be noted that for some purposes smooth plates are preferable, but in every case the passage or channel for liquid dispersion flow between the plates should be maintained uniform and preferably small. This does not present any particular critical problem as it is easy to maintain the plates with substantially parallel faces and the micrometric adjustment which moves one of the plates permits setting and maintaining the uniform flow path which is relatively thin.

Reference has been made to piezoelectric generation of the ultrasonic or high sonic vibrations along the probe. In general this is preferable, and equipment with piezoelectric generation is generally available. However, the invention is not really concerned with how the longitudinal vibrations of the probe are produced and any other means, such as, for example, magnetostriction, are included in a broader aspect of the invention.

DESCRIPTION OF THE PREFERRED EMBODIMENTS

Figure 1:
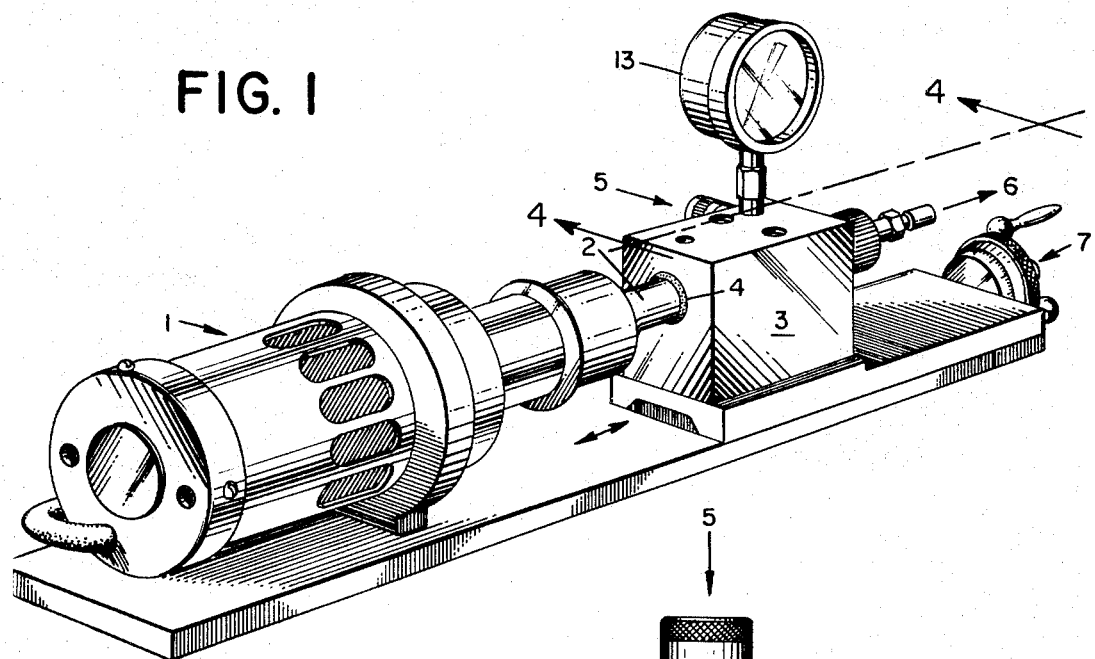
FIG. 1 is an isometric of the whole device of the present invention.

FIG. 1 shows a piezoelectric ultrasonic generator 1 which, as it is of standard design, is shown purely diagrammatically. 2 is an ultrasonic probe, also of conventional design, entering a treatment chamber 3 through an elastic sealing ring 4 at or near an odd quarter wave node on the probe 2. The container is provided with side liquid inlet 5 and an axial outlet 6 and a pressure gauge 13 to measure the pressure of the liquid upstream of the chamber when operation under pressure is used. The whole chamber is mounted on a micrometric threaded feed 7 of conventional design and can be moved longitudinally along the probe 2 as indicated by the double arrow. The length of the arrow is greatly exaggerated for clarity because the actual movement for adjustment of plate spacings is quite small, so that the ring 4 is not moved far from the old quarter wave node.

Figure 2:
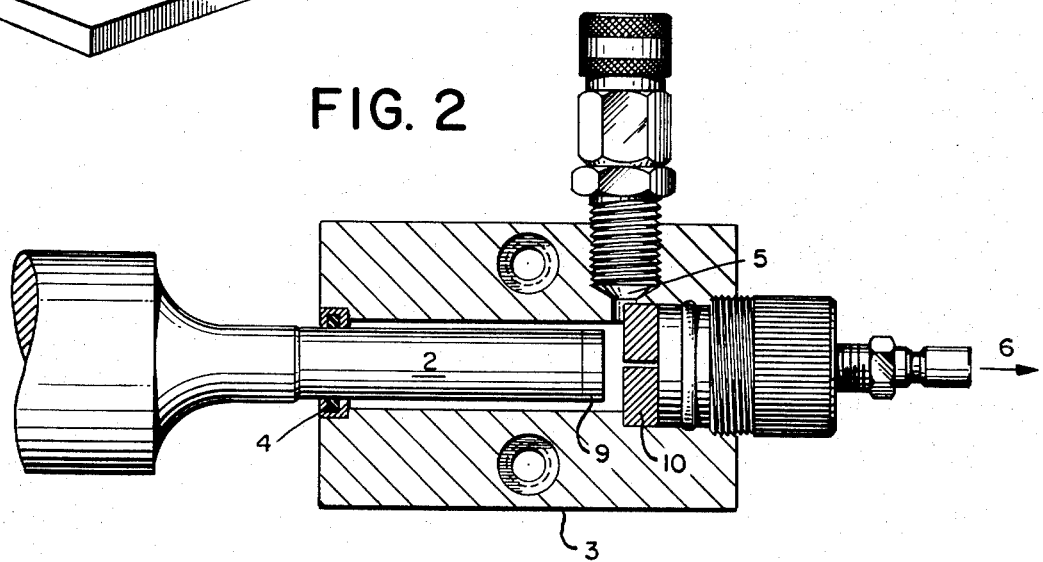
FIG. 2 is a horizontal section through the treatment chamber along the line 2—2 of FIG. 4.
Figure 4:
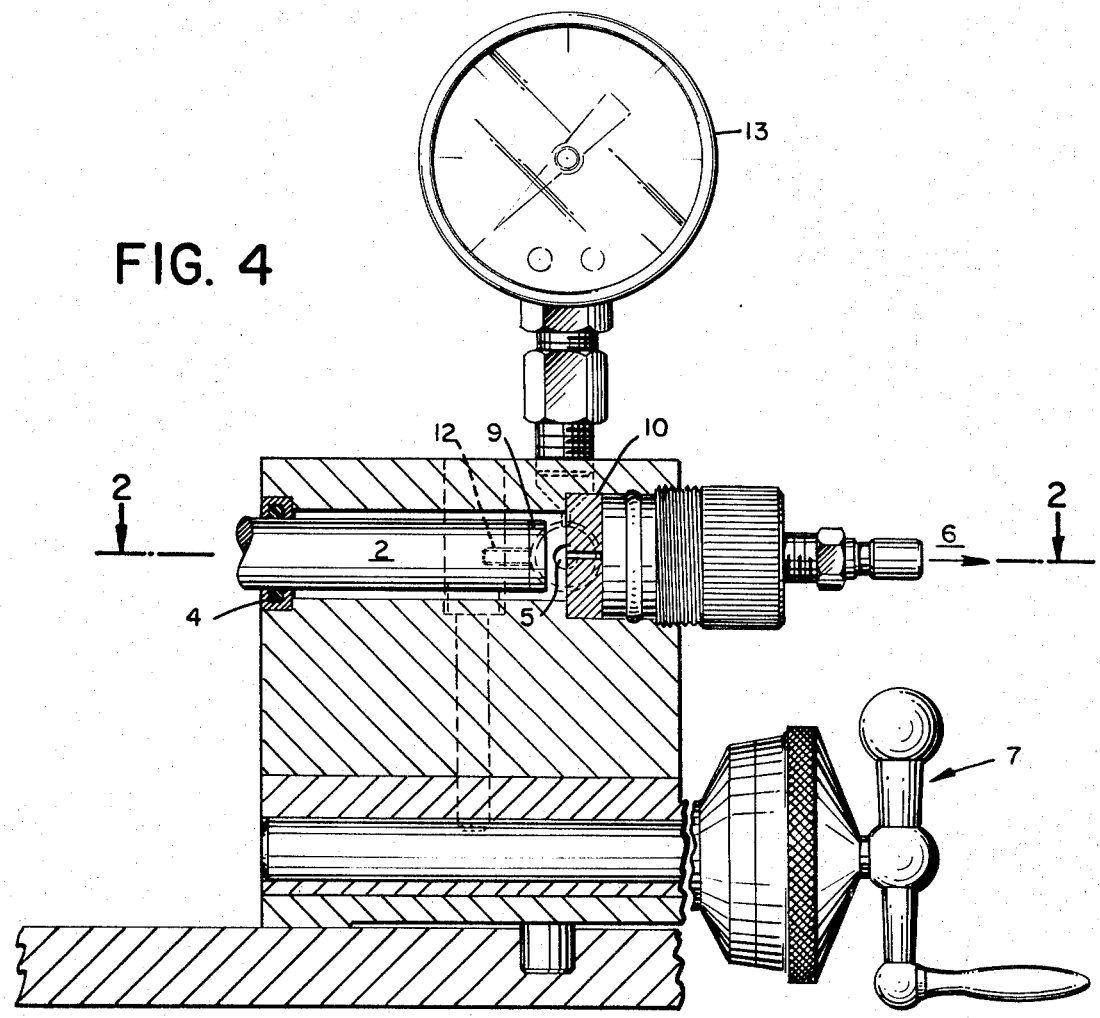
FIG. 4 is a vertical section taken along the line 4—4 of FIG. 1.

FIGS. 2 and 4 are sections through the treatment chamber with a plate 9 screwed into the tapped hole 12 on the end of the probe and a plate 10 attached to the container 6. The spacing of the two plates is determined by the micrometric threaded feed 7, which also shows in FIG. 4. The actual spacing of the plates 9 and 10 is shown somewhat exaggerated, and actually they are quite close together.

Figure 3:
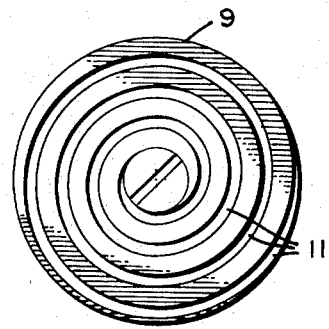
FIG. 3 is an elevation of the face of one plate.

FIG. 3 shows the face of the plate 9 in a form with a spiral baffle 11. This baffle causes liquid coming in through the liquid conduit 5 to pass across the plate more slowly and to be distributed over the whole of the plate surface. After passing between the plates the liquid flows out through the axial outlet 6.

From the standpoint of the apparatus as such, the direction of liquid flow through the conduits 5 and 6 could be reversed. That is to say, it would be possible to introduce liquid through the conduit 6 and have it flow out the conduit 5. however, this is not preferred. From a process standpoint, however, the flow direction in through the lateral conduit 5 and out through the axial conduit 6 permits an economical rupturing of suspension of yeast cells to a degree which meets government regulations where a protein high in lysine is to be recovered for use as a food additive. Even with easily ruptured cell suspensions or other liquid media which require something less than maximum ultrasonic agitation, there is an advantage in introducing the liquid through the inlet tube 5 as this will permit maximum output for a given ultrasonic power.

The particular sonic vibration frequency is in no sense critical, but for many purposes the rather common range of ultrasonic frequencies from a little below 20 kilocycles to 40 kilocycles is very satisfactory and corresponds to readily available equipment at moderate costs. For certain purposes much higher or lower frequencies may be needed and the invention is, therefore, not limited in any way to a particular frequency. For certain very viscous material sometimes the frequency is chosen somewhat below the ultrasonic range.

It will be noted that the present invention can be operated either as a single pass operation, which is often economically desirable in the case of cell rupturing, or the medium can be recycled and pass through the equipment a number of times. The flexibility and versatility of the invention for treatment of various liquid media of different characteristics is a practical advantage. Since the flow through the apparatus of the present invention is continuous, it lends itself to the processing of a multiplicity of liquid flows. This makes possible an economic production of mixtures of liquids.

It will be noted from FIGS. 1 and 2 that the cross-section of the probe 2 and of the plate 9 is less than the cross-section of the rod at the source of vibration. In other words the probe includes an acoustic velocity transformer with the plate 9 moving at higher velocity than at the source.

I claim:

1. An apparatus for sonic agitation of liquid media comprising a sonic probe, a sonic generator imparting longitudinal vibrations thereto, the probe constituting a velocity transformer with a larger cross-section at the sonic generator than the probe end, a closed container, the probe entering the container through an elastic seal at approximately an odd quarter wave nodal point for the sonic frequency used, a plate fastened to the end of the sonic probe, said plate having a cross-sectional area less than the cross-section of the probe at the sonic generator and opposite a plate fastened to the container, means for adjusting the spacing between plates through a small distance, liquid conduits, one to the periphery of the space between the plates and the other axially, and means for causing liquid to flow through the container.

2. An apparatus according to claim 1 in which the means for causing liquid flow is a means for causing liquid to flow into the periphery of the space between plates and out axially.

3. An apparatus according to claim 2 in which one of the plates is provided with baffling means on its face to cause liquid to flow through an elongated path between the plates and means for precisely adjusting plate position and orientation.

4. An apparatus according to claim 2 in which the plates have smooth faces.

5. An apparatus according to claim 1 in which one of the plates is provided with baffling means on its face to cause liquid to flow through an elongated path between the plates and means for precisely adjusting plate position and orientation.

* * * * *